United States Patent
Zur et al.

(10) Patent No.: US 7,966,613 B2
(45) Date of Patent: Jun. 21, 2011

(54) SYSTEM AND METHOD FOR SUPPORTING MULTIPLE USERS

(75) Inventors: Uri El Zur, Irvine, CA (US); Gregory Young, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1327 days.

(21) Appl. No.: 11/038,818

(22) Filed: Jan. 20, 2005

(65) Prior Publication Data

US 2005/0160251 A1 Jul. 21, 2005

Related U.S. Application Data

(60) Provisional application No. 60/537,785, filed on Jan. 20, 2004, provisional application No. 60/585,360, filed on Jul. 1, 2004.

(51) Int. Cl.
*G06F 9/455* (2006.01)
(52) U.S. Cl. .............................. 718/1; 719/318; 719/330
(58) Field of Classification Search .................. 719/311, 719/319, 318, 330; 718/1
See application file for complete search history.

(56) References Cited

U.S. PATENT DOCUMENTS

| 5,961,582 A * | 10/1999 | Gaines ............................. 718/1 |
| 6,269,409 B1 | 7/2001 | Solomon |
| 6,895,480 B2 * | 5/2005 | Heil ............................. 711/153 |
| 6,968,466 B2 * | 11/2005 | Bolian et al. ................... 713/300 |
| 7,028,305 B2 * | 4/2006 | Schaefer ....................... 719/310 |
| 2002/0015042 A1 | 2/2002 | Robotham et al. |
| 2003/0110173 A1 | 6/2003 | Marsland |

FOREIGN PATENT DOCUMENTS

| EP | 0889402 A | 1/1999 |
| WO | WO 01/7999 A | 10/2001 |

* cited by examiner

*Primary Examiner* — Andy Ho
(74) *Attorney, Agent, or Firm* — McAndrews, Held & Malloy, Ltd.

(57) ABSTRACT

Systems and methods that support splitting a compute resource from its input/output and sharing among one or more users are provided. In one embodiment, a system that supports one or more user devices may include, for example, a compute engine, a first user device and a second user device. The compute engine may be adapted to provide virtualization. The virtualization may provide, for example, a first instance of a particular operating system and a second instance of the particular operating system. The first user device may be coupled to the compute engine and may access the first instance of the particular operating system. The second user device may be coupled to the compute engine and may access the second instance of the particular operating system. In one example, the user devices are input/output devices that do not run applications or operating systems.

37 Claims, 5 Drawing Sheets

SYSTEM AND METHOD FOR SUPPORTING MULTIPLE USERS

CROSS REFERENCE TO RELATED APPLICATION

This application makes reference to, claims priority to and claims benefit from U.S. Provisional Patent Application Ser. No. 60/537,785, entitled "Computer System Architecture Supporting Multiple Users" and filed on Jan. 20, 2004; and U.S. Provisional Patent Application Ser. No. 60/585,360, entitled "Method and System for a Thin Client and Blade Architecture" and filed on Jul. 1, 2004.

INCORPORATION BY REFERENCE

The above-referenced U.S. patent application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In a conventional desktop blade system, a user desktop is coupled to a basic Ethernet switch using a thin protocol such as, for example, a remote desktop protocol (RDP). The switch provides mapping of the user desktop to a server blade. The switch is coupled to a plurality of server blades via a blade fabric that supports 10/100 Base-T access methods. The user desktop is a general-purpose computer with a central processing unit (CPU) running a single general-purpose operating system (e.g., DOS, Windows). The server blade operates a single general-purpose operating system on which one or more applications run.

Further limitations and disadvantages of conventional and traditional approaches will become apparent to one of ordinary skill in the art through comparison of such systems with one or more aspects of the present invention as set forth in the remainder of the present application with reference to the drawings.

BRIEF SUMMARY OF THE INVENTION

Some aspects of the present invention may be found in, for example, systems and methods that support one or more users.

In one embodiment according to some aspects of the present invention, a system may include, for example, a compute engine with a central processing unit (CPU), a chipset, a fabric controller and a storage (e.g., direct attached storage (DAS) or external storage). An I/O collector unit takes the output to the local display and the optional audio output and optional other I/O output (e.g., USB feedback and commands to USB devices) and processes it. The processing may include, for example, one or more of the following: format changing, compression, adaptation to network transport, adaptation to network delay and jitter, and adaptation to limited network bandwidth. The I/O collector may forward these signals to the fabric controller for transmission over the fabric to the remote device or devices.

In one embodiment according to some aspects of the present invention, the I/O collector may be implemented in a way that does not disrupt the hardware or software or operating system or application infrastructure of the compute engine. It allows use of high volume hardware and software to create the new model of remote device which may be an I/O device without local application compute power.

In one embodiment according to some aspects of the present invention, the remote device presents to its user a compute environment that is no different from the experience one would get with a complete local compute engine. The remote device does not necessarily need to have the ability to run an operating system or the application. It may have processing power to adapt the I/O to the I/O devices available to the remote user. It also may have the ability to adapt the I/O to the network in a way similar to the compute engine.

In one embodiment according to some aspects of the present invention, a standard machine designed for local input and output can be dissected into compute and I/O. However, there might be no change to the compute engine except, for example, adding an I/O collector. The remote user can be implemented with a very low cost hardware while preserving the abilities of the larger compute engine and exposing them to its user.

In one embodiment according to some aspects of the present invention, a system that supports one or more user devices may include, for example, a compute engine, a first user device and a second user device. The compute engine (e.g., one or more servers) may be adapted to provide virtualization. The virtualization may provide, for example, a first instance of a particular operating system and a second instance of the particular operating system. The first user device may be coupled to the compute engine and may access the first instance of the particular operating system. The second user device may be coupled to the compute engine and may access the second instance of the particular operating system.

In one embodiment according to some aspects of the present invention, a system that supports one or more user devices may include, for example, a compute engine, a first user device and a second user device. The compute engine may be adapted to provide virtualization. The virtualization may provide, for example, a first instance of a particular operating system and a second instance of the particular operating system and/or a first instance of another operating system. The first user device may be coupled to the compute engine and may access the first instance of the particular operating system. The second user device may be coupled to the compute engine and may access the second instance of the particular operating system and/or the first instance of another operating system.

In another embodiment according to some aspects of the present invention, a server may include, for example, a plurality of server blades, a first user device and a second user device. The plurality of server blades may include, for example, a particular server blade that provides virtualization. The virtualization may provide, for example, a first instance of a particular operating system and a second instance of the particular operating system. The first user device may be coupled to the particular server blade via a network and may access the first instance of the particular operating system. The second user device may be coupled to the particular server blade via the network and may access the second instance of the particular operating system. The first user device and the second user device might not locally provide operating system resources. The particular server blade may provide the operating system resources for the first user device and the second user device.

In another embodiment according to some aspects of the present invention, a user device may provide, for example, one or more of the following: a user interface, an input/output (e.g., a local input/output via, for example, USB, BlueTooth or wireless) and connectivity to a compute engine. The user device may provide input via one or more input devices (e.g., a keyboard and a mouse) and output via one or more output devices (e.g., a user display or displays and a speaker) while the information, for example, to be presented is computed on an external host (e.g., an external compute engine host) with minimal processing (e.g., optional video decompressing and driving a display) on the user device.

In yet another embodiment according to some aspects of the present invention, a method that supports multiple user devices may include, for example, one or more of the following: virtually providing a plurality of instances of an operating system on a server; coupling, via a network, a plurality of remote user devices with the plurality of instances of the operating system, each remote user device being coupled with a respective instance of the operating system; and remoting, with respect to the plurality of remote user devices, processing resources to the server.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some embodiments according to some aspects of the present invention may relate to, for example, systems and methods that support one or more devices (e.g., one or more user devices). Some embodiments according to some aspects of the present invention may relate to, for example, systems and methods that support one or more users.

Some embodiments according to some aspects of the present invention may support splitting compute resources from an input/output system. Some embodiments according to some aspects of the present invention provide the ability to support a remote input/output (I/O) system, where the remote I/O system provides signals to the compute resource and the compute resource provides feedback to the remote I/O system.

Some embodiments according to some aspects of the present invention may provide virtualization in a compute engine (e.g., a server). The virtualization may provide, for example, multiple instances of an operating system and multiple instances of a program running on respective instances of the operating system.

Some embodiments according to some aspects of the present invention may provide that processing resources be migrated to or centralized in a compute engine. Some embodiments according to some aspects of the present invention may provide that remote user devices be simplified such that remote user devices need not provide substantial processing resources. Some embodiments according to some aspects of the present invention provide that remote user devices employ embedded systems. Some embodiments according to some aspects of the present invention provide that input signals received by remote user devices be sent, via a network, to a compute engine that provides processing. Some embodiments according to some aspects of the present invention provide that output signals generated by a compute engine are sent, via a network, to a remote user for presentation to the user.

Some embodiments according to some aspects of the present invention may provide that storage resources be migrated to or centralized via a compute engine. Some embodiments according to some aspects of the present invention may provide that remote user devices be simplified such that remote user devices need not provide substantial storage resources. Some embodiments according to some aspects of the present invention provide that the remote user devices can access, over a network, storage resources via a compute engine. In some embodiments according to some aspects of the present invention, the storage resources may be directly attached to the compute engine or the storage resources may be coupled to the compute engine via, for example, a storage network. In some embodiments according to some aspects of the present invention, storage resources may be coupled to a remote user device and made available to a compute engine. For example, a memory stick coupled to the remote user device via a universal serial bus (USB) port may be made available to a compute engine.

Some embodiments according to some aspects of the present invention may provide a server system that includes, for example, one or more server blades. In some embodiments according to some aspects of the present invention, a particular server blade in a server system may provide virtually multiple instances of an operating system. The virtually provided multiple instances of the operating system may be operating concurrently on the particular server blade. Each instance of the operating system may be associated with (e.g., dedicated to or exclusively associated with) a respective user device that is coupled to the particular server blade via a network.

Figure 1:
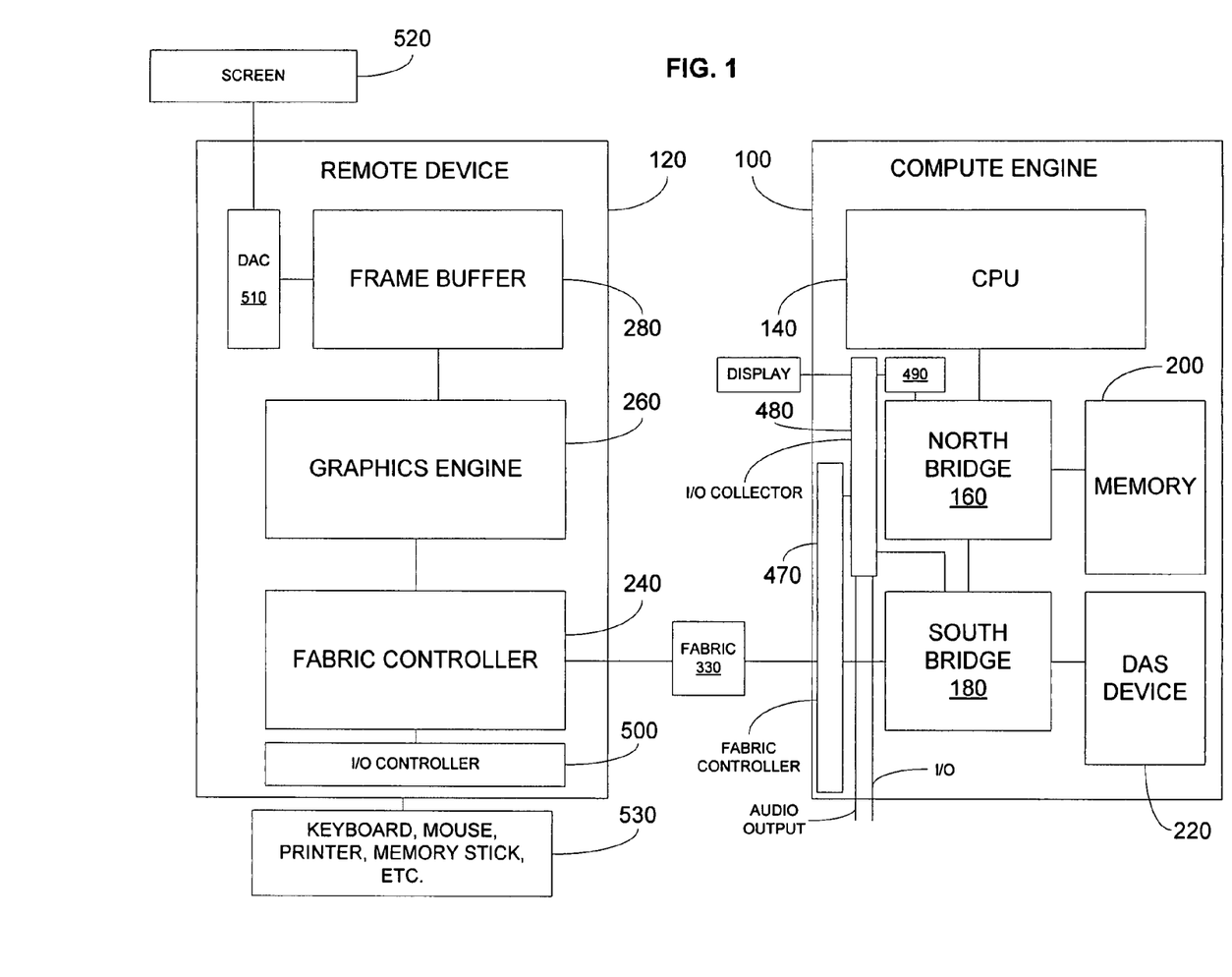
FIG. 1 shows a block diagram illustrating an embodiment of a system that supports multiple users according to some aspects of the present invention.

FIG. 1 shows a block diagram illustrating an embodiment of a system that supports multiple users according to some aspects of the present invention. The system may include, for example, one or more compute engines 100 coupled to one or more remote devices 120. Referring to FIG. 1, the compute engine 100 may be coupled to the one or more remote devices 120 via a fabric 330 (e.g., one or more wired networks and/or wireless networks). The compute engine 100 may include, for example, a central processing unit (CPU) 140, a north bridge 160, a south bridge 180, a memory 200, a fabric controller 470, an input/output (I/O) collector 480, a processor 490 (e.g., a graphics engine) and a direct attached storage (DAS) device 220 (e.g., a hard drive). Instead of or in combination with the DAS device, the compute engine 100 may be coupled to a storage system (e.g., a network attached storage (NAS) device, a storage area network (SAN) and/or other types of storage devices/systems). The remote device 120 may include, for example, a fabric controller 240 (e.g., a Gigabit Ethernet (GbE) controller), a graphics engine 260, a frame buffer 280 (e.g., a display buffer), an I/O controller 500, a digital-to-analog converter (DAC) 510, a screen 520 and other input/output devices 530 (e.g., a keyboard, a mouse, a printer, a memory stick).

FIG. 1 shows some of the connections between illustrated components which may apply to some embodiments according to some aspects of the present invention. For example, the fabric controller 240 of the remote device 120 may be coupled to a fabric switch or the fabric controller 470 of the compute engine 100 which, in turn, may be coupled to the north bridge 160 or to the south bridge 180. The south bridge 180 may be coupled to the DAS device 220. The memory 200 may be coupled to the north bridge 160 which, in turn, may be coupled to the CPU 140. The south bridge 180 or the north bridge 160 may be coupled to the fabric controller 470 which, in turn, may be coupled to the fabric 330. The I/O collector 480 may be coupled with the processor 490 (e.g., a graphics engine) and with audio I/O of the south bridge 180 and with other I/O (e.g., USB I/O) of the south bridge 180. On the remote device 120, the fabric 330 may be coupled to the fabric controller 240 which, in turn, may be coupled to the graphics engine 260. The graphics engine 260 may be coupled to the frame buffer 280. The graphics engine 260 may be coupled, for example, to the screen 520 (e.g., a monitor and a display device such as, for example, a liquid crystal display, a light emitting diode (LED) display and a plasma display). The I/O controller 500 may be adapted to interface with user input devices (e.g., a keyboard and a mouse) or devices that may expand user capabilities (e.g., a USB memory stick, a printer, a headset, etc.) In some embodiments according to some aspects of the present invention, the couplings between the compute engine 100 and the remote device 120 may be over the same network (e.g., an Ethernet, a local area network (LAN), etc.) via the fabric controllers 240, 470. It is possible to have the north bridge 160 and the south bridge 180 of the compute engine 100 integrated into a single chip set or to have different functionality split between them. It is also possible to have the memory controller as part of the CPU 140.

In operation, input signals received by the remote device 120 such as, for example, input signals generated by a user interface (e.g., a keyboard, a mouse, a graphical user interface, microphone, video camcorder, digital camera, etc.), which can be disposed at or part of the remote device 120, are received by the fabric controller 240. In some embodiments according to some aspects of the present invention, little or no processing occurs in the remote device 120. For example, the remote device 120 might not provide a local operating system (e.g., a local, general-purpose operating system). The fabric controller 240 packages or frames, for example, the input signals which are destined for the compute engine 100. In some embodiments according to some aspects of the present invention, security may be applied to the data, for example, for platform access rights and authentication and/or for data security using, for instance, authentication and/or encryption. The fabric controller 240 then places the packets on the fabric 330 (e.g., a Gigabit Ethernet), which routes the packets to the compute engine 100 and, in particular, to the fabric controller 470 of the compute engine 100. The fabric controller 470, which may be coupled to the south bridge 180, forwards the framed input signals received from the remote device 120 to the CPU 140 for processing, for example, by an operating system or a program (e.g., an application) running on the operating system. The input signals of the remote device 120 may also be stored in the memory 200 where the stored signals may be accessed by the CPU 140.

Some embodiments according to some aspects of the present invention provide that the CPU 140 provides virtualization. The virtualization can provide, for example, multiple instances of the operating system. The virtualization can also provide, for example, multiple instances of a program (e.g., an application such as, for example, a word processing application, a spread sheet application, a database application etc.). Each instance of the program can run on a respective instance of an operating system. Thus, each remote device 120 can access (e.g., exclusively access and/or concurrently access) a respective instance of the operating system. Furthermore, each remote device 120 can access (e.g., exclusively access and/or concurrently access) a respective instance of a particular program running on a respective instance of an operating system. Thus, for example, a first remote device 120 can access, via virtualization, a first instance of a particular word processing program running on a first instance of a particular operating system; a second remote device 120 can access, via virtualization, a second instance of the particular word processing program running on a second instance of the particular operating system. The running of the instances of the particular operating system and the particular word processing program may be isolated from each other via virtualization.

The compute engine 100 can also communicate with storage units or systems that are coupled to the compute engine 100. For example, the compute engine 100 may provide support for one or more protocols that enable communication with one or more storage units or system including, for example, small computer system interface (SCSI), Internet SCSI (iSCSI), remote direct memory access (RDMA), or other protocols (e.g., proprietary protocols or customized protocols) such as, for example, Fibre Channel. Thus, the CPU 140 can access (e.g., read from or write into) the storage units or systems.

The north bridge 180 can provide a connection, for example, to the memory 200 or the CPU 140. After processing, the CPU 140 sends the processed signals to the remote device 120 and, in particular, to the fabric controller 240. The fabric controller 240 distributes the signals, for example, to the graphics engine 260 and/or to the I/O controller 500 of the remote device 120. The processed signals may be, for example, packaged and compressed by the CPU 140 or the north bridge 160 or by the I/O collector 470 before being sent to (e.g., routed to) the graphics engine 260 of the remote device 120. The graphics engine 260 adapts, for example, the processed signals for output via an output device (e.g., a display), while the I/O controller 500 adapts other signals for output or for commands to the I/O devices (e.g., a printer, a speaker, etc.). For example, the graphics engine 260 can adapt the processed signals to generate frame signals which are sent to the frame buffer 280 for display.

In some embodiments according to some aspects of the present invention, a mouse moved by a remote user using the remote device 120 generates input signals. The input signals generated by the mouse are processed by the I/O controller 500 and moved to the fabric controller 240 to be are framed and to be sent to the compute engine 100. The compute engine 100 processes the input signals. In some embodiments according to some aspects of the present invention, through virtualization, the fabric controller 470 on the compute engine may distribute the signals to a corresponding one of the possibly multiple instances of the operating system or a program running thereon processes the input signals. In some embodiments according to some aspects of the present invention, neither the CPU 140, an operating system nor an application may be able to differentiate between the inputs generated on the remote device 120 and those generated locally. The CPU 140 determines the output (e.g., display, speaker, etc.) or any other consequences in view of the generated input signals by processing the input signals. Once determined, output signals are sent from the compute engine 100 to its local I/O devices. The I/O collector 480 may be used to collect the I/O and to feed it to the fabric controller 470 for framing. The fabric controller 470 sends the data to the selected remote device 120 which then generates an output based on the output signals (e.g., displays the output signals on a display of the remote device 120, displays the changes in the output signals on the display of the remote device 120, generates an audio output, etc.). Thus, in some embodiments according to some aspects of the present invention, the operating system processing or the application processing is accomplished at the compute engine 100 and not at the remote device 120.

Some embodiments according to some aspects of the present invention may provide, for example, that a plurality of remote devices 120 are coupled to, for example, a compute engine 100. The remote devices 120 may then share the resources of the compute engine 100 including, for example, processing, storage, memory, networking and graphics. In some embodiments according to some aspects of the present invention, the resources are shared via virtualization.

Figure 2:
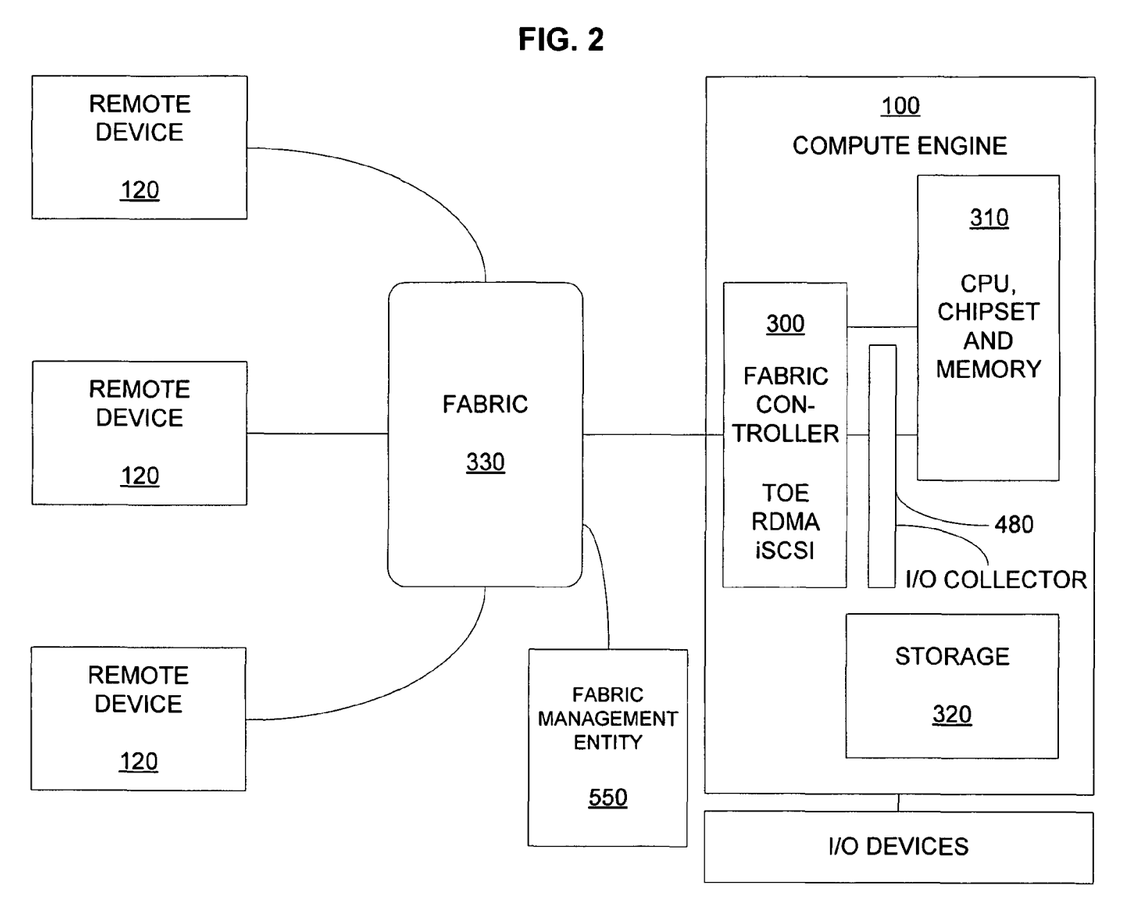
FIG. 2 shows a block diagram illustrating an embodiment of a system that supports multiple remote devices according to some aspects of the present invention.

FIG. 2 shows a block diagram illustrating an embodiment of a system that supports multiple remote devices according to some aspects of the present invention. The multiple remote devices 120 are coupled to the compute engine 100 via a fabric 330 (e.g., an Ethernet, a Gigabit Ethernet, a local area network (LAN), etc.). The compute engine 100 includes, for example, a CPU, chipset and memory (CCM) 310, an I/O collector 480, a fabric controller 300, a physical layer (not shown) and storage 320. For simplicity, some of the connections and some of the components of the compute engine 100 are illustrated in FIG. 2. The compute engine 100 can be one of a plurality of compute engines 100 that form a server system, for example, in one or more locations. Although illustrated as part of the compute engine 100, the storage 320 can be DAS or network storage (e.g., storage coupled to the compute engine 100 via a network). The compute engine 100 can use the fabric controller 300 (e.g., a GbE controller) to communicate with network storage, for example. To accelerate access to the network storage and to free resources of the CCM 310, the fabric controller 300 can be configured to support, for example, transmission control protocol (TCP) offload, RDMA and/or iSCSI. In some embodiments according to some aspects of the present invention, the protocol support can be accomplished mostly in hardware (e.g., an integrated circuit or an integrated semiconductor chip).

Some embodiments according to some aspects of the present invention provide that the remote users 120 share the resources of the compute engine 100 via virtualization. Some embodiments according to some aspects of the present invention provide that the compute engine 100, via virtualization, run as many instances of the operating system as there are remote devices 120 associated with it. Some embodiments according to some aspects of the present invention provide that, via virtualization, each remote device 120 can access (e.g., exclusively access with respect to other remote devices 120) its own instance of the operating system or its own instance of the application. In some cases, virtualization may allow existing applications, application programming interfaces (APIs) and/or the operating system to operate with no additional changes.

Some embodiments according to some aspects of the present invention provide that the remote devices 120 provide the same services to is user as if the remote device 120 locally ran the operating system and full hardware (e.g., storage, audio hardware, visual hardware, etc.). In some embodiments according to some aspects of the present invention, a user of a remote device 120 would not be able to easily ascertain whether the operating system and application were running locally or was being accessed remotely. Remoting processing resources (e.g., operating system resources) to the compute engine 100 can be seamless from the point of view of the user.

Some embodiments according to some aspects of the present invention provide that the remote devices 120 and the compute engine 100 provide security on the communications between the remote devices 120 and the compute engine 100. Security can take many forms known in the art such as, for example, machine authentication, data authentication (e.g., data authentication for keyboard and mouse traffic) and privacy employing encryption (e.g., using keys) and authentication. In some embodiments according to some aspects of the present invention, the remote devices 120 provides a trusted platform module. The security measures secure, for example, one or more of the following: deployment, management, content distribution, user identity, etc.

Some embodiments according to some aspects of the present invention provide a fabric management entity 550. The fabric management entity 550 can be used, for example, to authenticate remote devices, to associate remote devices with a compute engine and/or to re-allocate compute engine resources due to increased load or in fail over scenarios. The fabric management entity 550 can also be used, for example, to grant access rights to a service, an application or fabric quality-of-service (QoS) or class of service (COS) service level or to negotiate QoS parameters between a remote device and the fabric 330. The attention of a fabric administrator may be drawn to, for example, one or more of the following: attack attempts by unauthorized remote devices; access requests to unauthorized locations, services, applications or devices; connection and usage rates; quality of service issues; and failures of compute engines or remote devices. A heart beat signal may be used to monitor the health of coupled devices.

Figure 3:
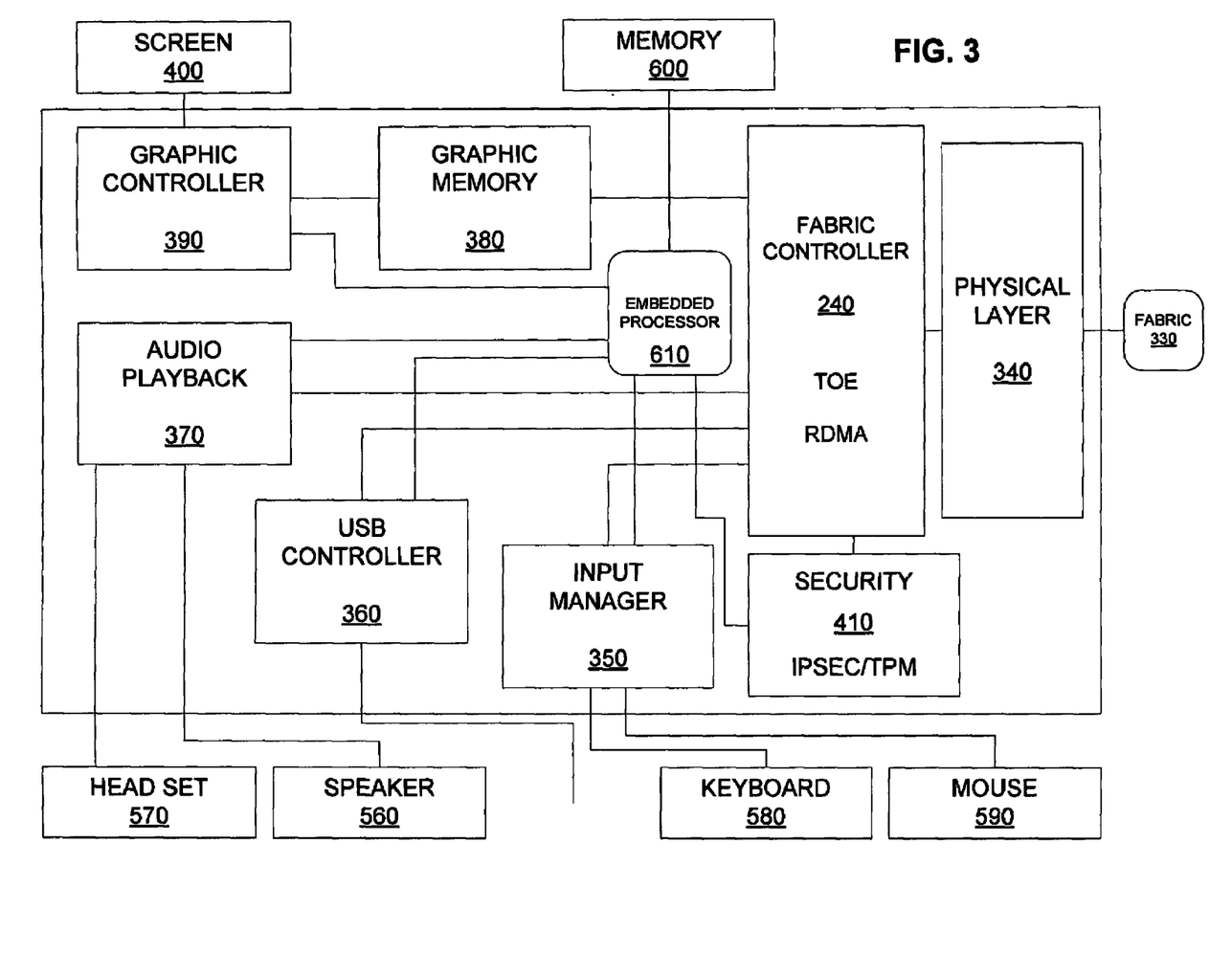
FIG. 3 shows a block diagram illustrating an embodiment of a remote user device according to some aspects of the present invention.

FIG. 3 shows a block diagram illustrating an embodiment of a remote user device according to some aspects of the present invention. For simplicity, the remote user device 120 is shown with only some of the components and with only some of the connections therebetween. As illustrated, the remote user device 120 includes, for example, a physical layer 340, a fabric controller 240, an input manager 350, a universal serial bus (USB) controller 360, an audio playback 370, a graphic memory 380 (e.g., a frame buffer), a graphic controller 390, a screen 400, a speaker 560, a headset 570, a keyboard 580, a mouse 590 and a security module 410. The input manager 350 includes, for example, a keyboard controller, a mouse controller and Bluetooth controller. The security module 410 provides, for example, one or more of the following: Internet Protocol security (IPsec) and a trusted platform module (TPM). The IPSec can secure, for example, the communication channels and the TPM can authenticate, for example, the remote device 120 to the compute engine 100 either directly or using the services of the fabric management entity 550.

In some embodiments according to some aspects of the present invention, the outputs may include, for example, one or more of the following: an additional audio device (e.g., a speaker and a headset) coupled to the audio playback 370; a USB device (e.g., a keyboard and a mouse) coupled to the USB controller 360; a screen 400 coupled to the graphic controller 390; and a network (e.g., a Gigabit Ethernet) coupled to the physical layer 340 wh5ich, in turn, is coupled to the fabric 330. In some embodiments according to some aspects of the present invention, some inputs may include, for example, one or more of the following: a keyboard, a mouse, a Bluetooth device, a video input, an audio input, a sensor input, a user interface (e.g., a graphic user interface) or other input devices coupled to the input manager 350; a network coupled to the physical layer 340; and a USB device coupled to the USB controller 360. In some embodiments according to some aspects of the present invention, the keyboard/mouse controller in the input manager 350 communicates (e.g., sends commands) with a compute engine over, for example, a Gigabit Ethernet. The physical layer 340 can generate an alert. The inputs and outputs may be removable such as, for example, a flash disk, a flash memory or a memory stick. Other inputs or outputs may include, for example, printer and a scanner.

Some embodiments according to some aspects of the present invention provide a graphics format that consumes approximately under 1 Gb/s of Ethernet bandwidth. Some embodiments according to some aspects of the present invention provide a graphics format that consumes approximately under 10 Mb/s of Ethernet bandwidth under most circumstances. Some embodiments according to some aspects of the present invention provide a graphics format characterized by low cost and high performance on the remote device 120. Some embodiments according to some aspects of the present invention provide a standard (or a derivative) graphics core on the remote device 120. Some embodiments according to some aspects of the present invention provide that graphic data received from the physical layer 340 via the fabric controller 240 is zero-copied into the graphic memory 380.

Some embodiments according to some aspects of the present invention may provide for a high performance graphics system even while remoting the high bandwidth interface from the CPU 140 of the compute engine 100 to the remote device 120.

Figure 4:
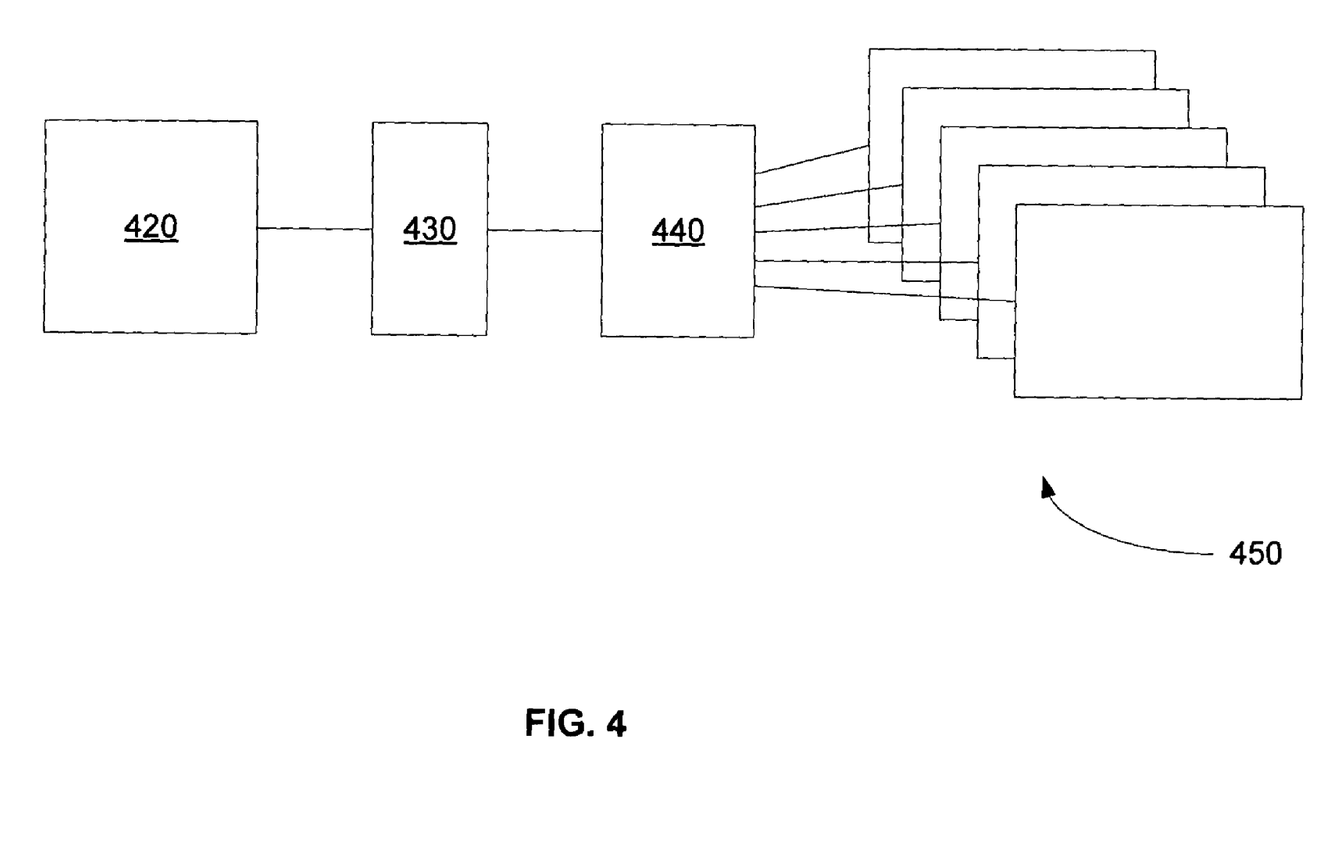
FIG. 4 shows a block diagram illustrating an embodiment of a system that supports multiple devices according to some aspects of the present invention.

FIG. 4 shows a block diagram illustrating an embodiment of a system that supports multiple devices according to some aspects of the present invention. A remote device includes, for example, a user desktop 420 that is coupled to a switch 430. The switch 430 is coupled to one or more compute engines including, for example, one or more of the server blades 450 via a blade fabric 440. In some embodiments according to some aspects of the present invention, the user desktop 420 uses an embedded input/output (I/O) system to communicate with an operating system instance running on a virtual desktop on one of the server blades 450.

In some embodiments according to some aspects of the present invention, the user desktop 420 is not a general-purpose computer. The user desktop 420 can employ, for example, an embedded system. In some embodiments according to some aspects of the present invention, the user desktop 420 can operate software that is permanently set into a read-only memory such as, for example, a ROM or a flash memory chip. The user desktop 420 can include, for example, one or more of the following: a low-cost embedded processor that can run a real time operating system (RTOS) with a TOE-enabled GbE controller that provides, for example, high performance graphics, low latency and low power requirements as compared to a processor running TCP/IP on a CPU; low compute requirements by running, for example, graphics over RDMA; and (at both ends) strong authentication via a TPM and encryption (e.g., of keyboard/mouse messages/ commands).

In some embodiments according to some aspects of the present invention, the user desktop 420 is coupled to the switch 430 via a network (e.g., a Gigabit Ethernet) that supports a protocol that has a high bandwidth to transport, for example, keyboard-video-mouse (KVM) data.

In some embodiments according to some aspects of the present invention, the switch 420 provides a one or more Gigabit switch with L3-7 filters. The switch 420 can be configured to secure communications between the user desktop 420 and the switch 420. The switch 420 is configured to support, for example, network data (e.g., LAN data), clustering data (e.g., SAN data and RDMA data) and storage data (e.g., iSCSI data). In some embodiments according to some aspects of the present invention, priority (e.g., higher priority) may be given to latency sensitive data such as, for example, mouse clicks, audio and clustering data (e.g., RDMA data) and storage data (e.g., iSCSI data). Different VLANs may be used to enable different QoS or COS.

In some embodiments according to some aspects of the present invention, the blade fabric 440 includes, for example, a 1 Gb/2.5 Gb/10 Gb serializer/deserializer (SerDes).

In some embodiments according to some aspects of the present invention, the server blades 450 provide dynamic cross blade resources allocation with virtual storage. The server blades 450 include, for example, one or more of the following: a desktop blade and storage blade. The storage blade can be, for example, an iSCSI storage blade. The iSCSI storage blade can provide, for example, serial-at-attachment (SATA)/ serially-attached-SCSI (SAS) drives, redundant array of independent disks (RAIDs) and storage virtualization. The desktop blade can be, for example, a diskless desktop blade. The diskless desktop blade can provide, for example, one or more of the following: a high performance desktop with dynamic hardware virtualization; iSCSI with iSCSI boot, TOE and/or RDMA that can provide fast virtualization and high performance graphic.

Figure 5:
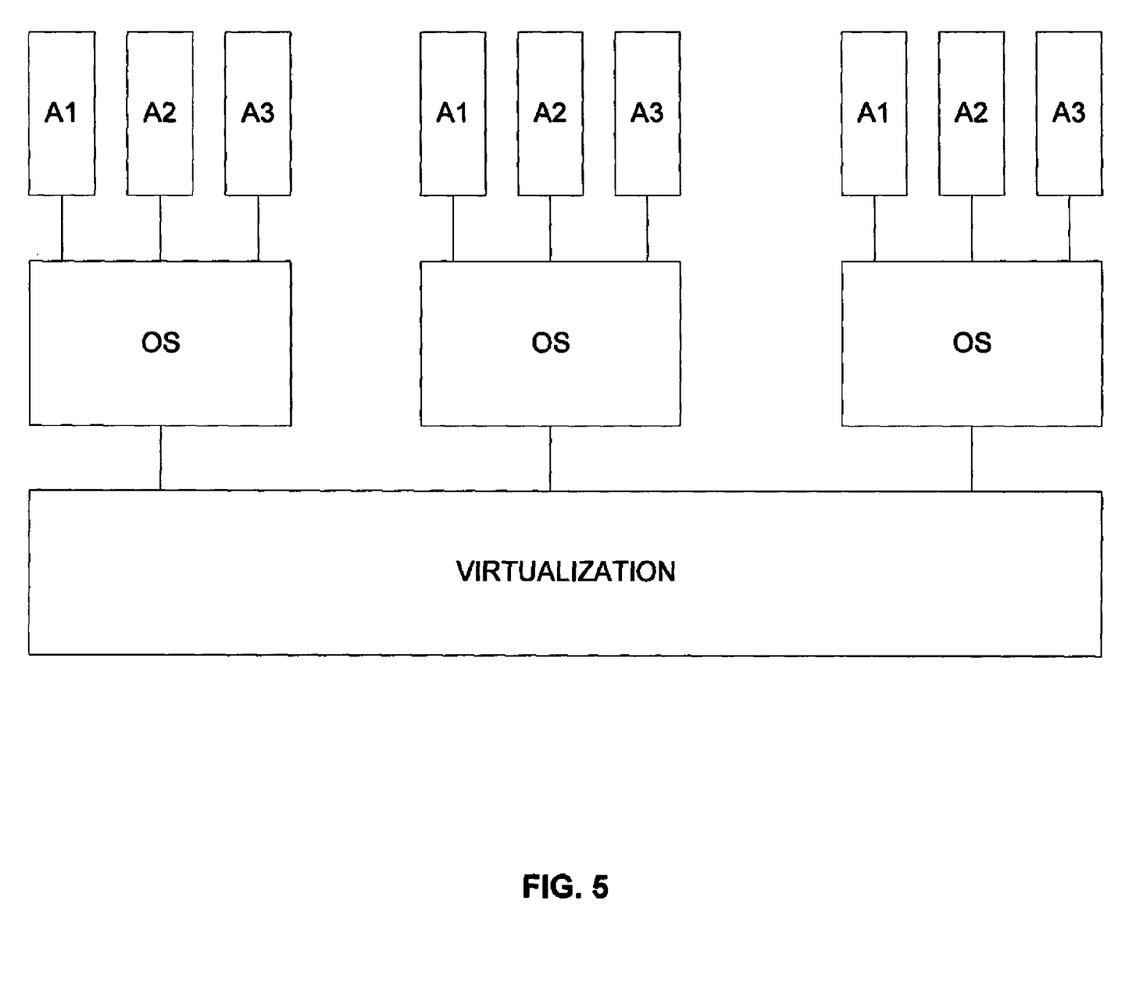
FIG. 5 shows a representation of an embodiment of virtualization according to some aspects of the present invention.

FIG. 5 shows a representation of an embodiment of virtualization according to some aspects of the present invention. The compute engine 100 provides virtualization. The virtualization provides multiple operating systems OS. In some embodiments according to some aspects of the present invention, the virtualization provides an operating system OS, along with the applications the OS supports, for each remote device 120. Each remote device may then have a dedicated operating system OS. An instance of each application A1 (e.g., a word processing application) can run on each instance of the operating system OS. An instance of each application A2 (e.g., a spread sheet application) can run on each instance of the operating system OS. An instance of each application A3 (e.g., a database application) can run on each instance of the operating system.

Some embodiments according to some aspects of the present invention may provide for a reduction in cost structures by centralizing the processing power of the system. For example, by centralizing the processing power in the compute engine 100 many resources may be shared by the plurality of remote devices 120. In another example, applications run by the CPU 140 may be shared by the remote devices 120. Some embodiments according to the present invention may provide for a compute engine 100 that employs virtualization such that each remote device 120 may be allocated its own virtual resources (e.g., its own dedicated copy of the application, its own dedicated copy of the operating system, virtual storage, etc.).

Some embodiments according to some aspects of the present invention may provide for better manageability. For example, with a centralized compute engine, many issues and problems may be dealt with at a central location. Furthermore, centralized resource sharing such as, for example, centralized storage or compute engine power sharing provides may be more manageable as well as more economical. Furthermore, the remote devices 120 may be simplified since most or all of the processing occurs in the compute engine 100.

One or more embodiments according to one or more aspects of the present invention may have one or more of the following advantages as set forth below.

Cost reduction for a desktop in the enterprise and consumer space where the traditional resources of a general-purpose desktop or computer are split between a remote user device and a compute engine. In the enterprise space, total cost of ownership (TCO) is reduced due to, for example, a reduction in capital expenditure (CAPEX); operational expenditures (OPEX) are reduced due to, for example, consolidation of personal computer (PC), storage, ease of management and application deployment. In the consumer space, multiple user can be supported with one compute engine; deployment costs are reduced due to, for example, cheaper and simpler desktop configurations (e.g., no need for a complete PC for each monitor); foot print is reduced; applications can be centrally deployed.

The user device can be shielded from changes in the OS, applications or hardware since the user device may only include the user I/O. Thus, the blade or the compute engine can evolve or be replaced with no need to re-deploy the users, which may be a very large number.

Service can be provided at little or no charge because of the low cost complexity, power and real estate of the remote device. For example, in case of a failure, the user can replace the user device instead of dispatching a technician, which is typically more costly. In a consumer environment, for example, the number of remote devices can grow over time.

This application makes reference to U.S. patent application Ser. No. 60/537,785 filed on Jan. 20, 2004; U.S. patent application Ser. No. 60/585,360 filed on Jul. 1, 2004; U.S. patent application Ser. No. 60/501,794 filed on Sep. 10, 2003; U.S. patent application Ser. No. 10/938,156 filed on Sep. 10, 2004; U.S.patent application Ser. No. 60/527,739 filed on Dec. 8, 2003; and U.S. patent application Ser. No. 11/007,063 filed Dec. 8, 2004. The above-identified applications are hereby incorporated by reference herein in their entirety.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for supporting multiple devices, comprising:
  a compute engine configured to provide virtualization, the compute engine comprising a central processing unit, the virtualization providing a first instance of a particular operating system and a second instance of the particular operating system;
  a first user device coupled to the compute engine via an Ethernet network and accessing the first instance of the particular operating system in a particular server blade of a plurality of server blades in a server, the first user device comprising a keyboard and a mouse, a fabric controller, a graphics engine and a display, the keyboard being operatively coupled to the fabric controller which provides access to the Ethernet network, the fabric controller being operatively coupled to the graphics engine which is operatively coupled to the display, wherein input signals generated by the keyboard and the mouse cannot be graphically processed locally and graphically displayed locally because the first user device lacks a local operating system, wherein the input signals generated by the keyboard and the mouse cannot be graphically processed locally and graphically displayed locally before being processed by the central processing unit of the compute engine, wherein the input signals generated by the keyboard and the mouse cannot be graphically displayed locally before being sent by the fabric controller to the compute engine over the Ethernet network, wherein the input signals received from the first user device are processed by the central processing unit of the compute engine, wherein the processed input signals are then sent to the first user device for display via the graphics engine and the display; and
  a second user device coupled to the compute engine and accessing the second instance of the particular operating system in the particular server blade.

2. The system according to claim 1, wherein the first user device and the second user device are coupled to the compute engine via the Ethernet network.

3. The system according to claim 1, wherein the compute engine employs a storage area network.

4. The system according to claim 1,
  wherein the first user device and the second user device comprise an embedded reduced-instruction-set-computer (RISC) core.

5. The system according to claim 1, wherein the compute engine supports transmission control protocol (TCP) offload, remote direct memory access (RDMA) and Internet small computer system interface (iSCSI).

6. The system according to claim 1, wherein the compute engine uses direct attached storage (DAS) and network storage.

7. The system according to claim 1,
  wherein the compute engine comprises a first bridge, a second bridge, a fabric controller, an I/O collector, a memory and a DAS,
  wherein the first bridge is coupled to the memory,
  wherein the second bridge is coupled to the DAS,
  wherein the first bridge and the second bridge are coupled to the I/O collector,
  wherein the I/O collector is coupled to the fabric controller,
  wherein the fabric controller is coupled to the first user device and the second user device via the Ethernet network.

8. The system according to claim 1, wherein the compute engine comprises processing resources of the compute engine, the first user device and the second user device.

9. The system according to claim 1, wherein processing resources of the first user device and the second user device are disposed in the compute engine.

10. The system according to claim 1,
  wherein the virtualization provides a first instance of a particular application running on the first instance of the particular operating system, and
  wherein the virtualization provides a second instance of the particular application running on the second instance of the particular operating system.

11. The system according to claim 10,
  wherein the first user device accesses the first instance of the particular application, and
  wherein the first user device accesses the second instance of the particular application.

12. The system according to claim 1,
wherein the first user device comprises a graphic memory, a graphic controller, a physical layer, an audio playback, a USB controller, an input manager and a security element,
wherein the physical layer is coupled to the Ethernet network,
wherein the fabric controller is coupled to the physical layer, the graphic memory, the graphic controller, the audio playback, the USB controller, the input manager and the security element,
wherein the fabric controller zero-copies graphic data from the physical layer to the graphic memory, and
wherein the graphic controller is coupled to the graphic memory.

13. The system according to claim 12,
wherein the graphic memory is operatively coupled to the central processor of the compute engine via a server blade fabric.

14. The system according to claim 13, wherein at least one of the first user device and the second user device comprise a Gigabit Ethernet controller coupled to a second bridge of the compute engine.

15. The system according to claim 1, further comprising:
a third user device coupled to the compute engine and accessing a third instance of the particular operating system,
wherein the virtualization provides a third instance of the particular operating system.

16. The system according to claim 1,
wherein the first user device comprises a first user interface and the second user device comprises a second user interface, and
wherein first input signals received by the first user interface are not completely processed by the first user device and second input signals received by the second user interface are not completely processed by the second user device.

17. The system according to claim 16,
wherein the first input signals are forwarded via a network to the compute engine for processing by the compute engine, and
wherein the second input signals are forwarded via the network to the compute engine for processing by the compute engine.

18. The system according to claim 17,
wherein the first input signals are processed by a program running on the first instance of the first operating system, and
wherein the second input signals are processed by a program running on the second instance of the second operating system.

19. The system according to claim 18,
wherein the compute engine sends the first processed signals to the first user device and sends the second processed signals to the second user device, and
wherein the first user device outputs the first processed signals and the second user device outputs the second processed signals.

20. The system according to claim 1, wherein the central processing unit, the first instance of the particular operating system, and the second instance of the particular operating system cannot differentiate between the input signals generated by the keyboard and the mouse at the first user device and second input signals generated by a second keyboard and a second mouse at the compute engine.

21. The method according to claim 1, wherein the first user device does not have its own central processing unit.

22. The system according to claim 1, comprising:
a fabric management entity that communicates with the compute engine, the first user device and the second user device over the Ethernet network, wherein the fabric management entity authenticates the first user device and the second user device, associates the first user device and the second user device with the compute engine and re-allocates compute engine resources due to increased load and fail over scenarios.

23. The system according to claim 22, wherein the fabric management entity grants access rights to a class of service (COS) service level and negotiates quality-of-service (QoS) parameters between the first user device and the Ethernet network 24. The system according to claim 22, wherein the fabric management entity uses a heart beat signal to monitor a health of the first user device, the second user device and the compute engine.

25. A server system comprising:
a plurality of server blades comprising a particular server blade, the particular server blade comprising a central processing unit, the particular server blade providing virtualization, the virtualization providing a first instance of a particular operating system and a second instance of the particular operating system;
a first user device coupled to the particular server blade via a network and accessing the first instance of the particular operating system, the first user device comprising a keyboard and a mouse, a fabric controller, a graphics engine and a display, the keyboard being operatively coupled to the fabric controller which provides access to the network, the fabric controller being operatively coupled to the graphics engine which is operatively coupled to the display, wherein keyboard signals and mouse movement signals generated by the keyboard and the mouse cannot be graphically processed and graphically displayed on the display before the keyboard signals and the mouse movement signals are sent over the network by the fabric controller to the compute engine for processing, wherein the keyboard signals and the mouse movement signals received from the first user device are processed by the central processing unit of the compute engine instead of being processed locally by the first user device, wherein the processed keyboard signals and the processed mouse movement signals are then sent to the first user device for display, wherein the display graphically displays mouse movements based on the processed mouse movement signals; and
a second user device coupled to the particular server blade via the network and accessing the second instance of the particular operating system,
wherein the first user device and the second user device do not locally provide operating system resources, and
wherein the particular server blade provides the operating system resources for the first user device and the second user device.

26. The server system according to claim 25,
wherein the first instance of the particular operating system or a first instance of a particular program running on the first instance of the particular operating system provides processing resources for the first user device, and
wherein the second instance of the particular operating system or a second instance of the particular program running on the second instance of the particular operating system provides processing resources for the second user device.

27. The server system according to claim 25, wherein the first user device does not have a local operating system with which to process the keyboard signals and the mouse movement signals for display, and wherein the first user device does not have the local operating system with which to process the mouse movement signals to graphically display the mouse movements.

28. The server system according to claim 25, wherein the central processing unit, the first instance of the particular operating system, and the second instance of the particular operating system cannot differentiate between the keyboard signals and the mouse movement signals generated by the keyboard and the mouse at the first user device and similar input signals generated at the particular server blade.

29. The server system according to claim 25, comprising:
a gigabit switch coupled to the first user device via the network, wherein the gigabit switch is coupled to the particular server blade via a blade fabric, wherein the gigabit switch comprises layer 3-7 filters, wherein the gigabit switch secures communications between the first user device and the gigabit switch, wherein the gigabit switch is configured to support network data, clustering data and storage data.

30. A method of supporting multiple user devices, comprising:
virtually providing a plurality of instances of an operating system on a particular server blade of a plurality of server blades of a server, the particular server blade comprising a central processing unit;
coupling, via a network, a plurality of remote user devices with the plurality of instances of the operating system, each remote user device being coupled with a respective instance of the operating system, a particular remote user device of the plurality of remote user comprising a keyboard and a mouse, a fabric controller, a graphics engine and a display, the keyboard and the mouse being operatively coupled to the fabric controller which provides access to the network, the fabric controller being operatively coupled to the graphics engine which is operatively coupled to the display;
generating mouse movement signals by moving the mouse, the particular remote user device being unable to graphically display mouse movements without first sending the generated mouse movement signals over the network to the central processing unit of the particular server blade for processing;
sending the generated mouse movement signals to the fabric controller, the fabric controller sending the generated mouse movement signals over the network to the central processing unit of the particular server blade;
receiving, by the particular server blade, the generated mouse movement signals via the fabric controller and the network;
processing the received mouse movement signals at the central processing unit instead of processing the generated mouse movement signals at the particular remote user device; and
sending the processed mouse movement signals over the network to the display of the particular remote user device to graphically display the mouse movements.

31. The method according to claim 30, wherein each remote user device being exclusively coupled with the respective instance of the operating system in a one-to-one correspondence.

32. The method according to claim 30, further comprising:
providing services to the particular remote device as if the particular remote device locally ran its own operating system, storage, audio hardware and visual hardware, when the operating system, the storage, the audio hardware and the visual hardware are remotely run at the server.

33. The method according to claim 30, wherein the particular remote user device does not have a local operating system with which to process the generated mouse movement signals for display, and wherein the particular remote user device does not have the local operating system with which to process the generated mouse movement signals to graphically display the mouse movements.

34. The method according to claim 30, wherein the central processing unit, the first instance of the particular operating system, and the second instance of the particular operating system cannot differentiate between the mouse movement signals generated by the mouse at the particular remote user device and similar input signals generated at the particular server blade.

35. The method according to claim 30, comprising:
communicating between a fabric management entity and the particular server blade over the network;
communicating between the fabric management entity and the remote user devices over the network;
authenticating the particular remote user device by the fabric management entity;
associating, by the fabric management entity, the particular remote user device with the particular server blade; and
re-allocating, by the fabric management entity, particular server blade resources due to increased load and failover scenarios.

36. The method according to claim 35, comprising:
granting, by the fabric management entity, access rights to a class of service (COS) service level; and
negotiating, by the fabric management entity, quality-of-service (QoS) parameters between the particular remote user device and the network.

37. The method according to claim 35, comprising:
providing a heart beat signal to monitor a health of the remote user devices and the particular server blade.

* * * * *